United States Patent
Bonnet et al.

(10) Patent No.: US 10,186,345 B2
(45) Date of Patent: Jan. 22, 2019

(54) INSULATED CONDUCTORS (71) Applicant: VICTREX MANUFACTURING LIMITED, Lancashire (GB)

(72) Inventors: James Bonnet, Lancashire (GB); Andrew Elleray, Lancashire (GB); Stuart Green, Lancashire (GB); Colin Rimmer, Lancashire (GB)

(73) Assignee: VICTREX MANUFACTURING LIMITED, Lancashire (GB)

( * ) Notice: Subject to any disclaimer, the term of this patent is extended or adjusted under 35 U.S.C. 154(b) by 0 days.

(21) Appl. No.: 15/545,876

(22) PCT Filed: Jan. 19, 2016

(86) PCT No.: PCT/GB2016/050106
§ 371 (c)(1),
(2) Date: Jul. 24, 2017

(87) PCT Pub. No.: WO2016/120592
PCT Pub. Date: Aug. 4, 2016

(65) Prior Publication Data
US 2018/0005724 A1     Jan. 4, 2018

(30) Foreign Application Priority Data

Jan. 30, 2015 (GB) .................................. 1501601.7

(51) Int. Cl.
*H01B 7/00* (2006.01)
*H01B 3/36* (2006.01)
(Continued)

(52) U.S. Cl.
CPC ........... *H01B 3/36* (2013.01); *C08G 65/4012* (2013.01); *H01B 1/026* (2013.01); *H01B 3/307* (2013.01);
(Continued)

(58) Field of Classification Search
CPC ...... H01B 1/026; H01B 3/36; H01B 13/0858; C08G 3/36; C08G 2650/40; H02K 3/02; H02K 3/30
(Continued)

(56) References Cited

U.S. PATENT DOCUMENTS 4,521,485 A * 6/1985 Tondre .................... H01B 3/30
174/110 FC
4,678,709 A * 7/1987 Tondre .................... H01B 3/30
174/110 FC
(Continued)

FOREIGN PATENT DOCUMENTS

CA    2867657 A1 * 8/2014 ............... H01B 7/02
EP    2 808 981 A2    12/2014
(Continued)

OTHER PUBLICATIONS

International Search Report (PCT/ISA/210) dated Jun. 3, 2016, by the Japanese Patent Office as the International Searching Authority for International Application No. PCT/GB2016/050106.
(Continued)

*Primary Examiner* — William H Mayo, III
(74) *Attorney, Agent, or Firm* — Buchanan Ingersoll & Rooney PC

(57) ABSTRACT

An insulated conductor has an elongate conductor provided with an insulating layer which comprises a polymeric material. The polymeric material has a crystallinity of at least 25% and includes a repeat unit of general formula (I)

(Continued)

wherein t1 and w1 independently represent 0 or 1 and v1 represents 0, 1 or 2. The insulating layer has a thickness in the range 2 μm-300 μm.

19 Claims, 3 Drawing Sheets

(51) Int. Cl.
  *C08G 65/40*   (2006.01)
  *H01B 3/42*   (2006.01)
  *H01B 3/30*   (2006.01)
  *H01B 1/02*   (2006.01)
  *H01B 13/08*   (2006.01)
  *H02K 3/02*   (2006.01)
  *H02K 3/30*   (2006.01)

(52) U.S. Cl.
  CPC ......... *H01B 3/427* (2013.01); *H01B 13/0858* (2013.01); *H02K 3/02* (2013.01); *H02K 3/30* (2013.01); *C08G 2650/40* (2013.01)

(58) Field of Classification Search
  USPC .... 174/110 R–110 E, 120 R, 120 SR, 121 R, 174/121 SC
  See application file for complete search history.

(56) References Cited

U.S. PATENT DOCUMENTS

| | | | |
|---|---|---|---|
| 2010/0203231 A1 | 8/2010 | Kusaka et al. | |
| 2011/0206880 A1* | 8/2011 | Wang | C08G 65/4037 428/36.9 |
| 2011/0212290 A1 | 9/2011 | Crawley et al. | |
| 2013/0062097 A1* | 3/2013 | Hammond | B32B 1/08 174/120 SR |
| 2013/0278117 A1* | 10/2013 | Parmeter | H02K 3/30 310/67 R |
| 2014/0102758 A1* | 4/2014 | Pagliuca | B32B 27/08 174/120 SR |
| 2014/0200466 A1* | 7/2014 | Sereno | A61L 27/18 600/508 |
| 2014/0353000 A1 | 12/2014 | Yin et al. | |
| 2015/0021067 A1* | 1/2015 | Muto | H01B 13/065 174/110 SR |
| 2017/0372813 A1* | 12/2017 | Parmeter | H01B 3/306 |

FOREIGN PATENT DOCUMENTS

| | | |
|---|---|---|
| GB | 2 492 087 A | 12/2012 |
| JP | H-02-250206 A | 10/1990 |
| WO | WO 2008/047091 A2 | 4/2008 |

OTHER PUBLICATIONS

Written Opinion (PCT/ISA/237) dated Jun. 3, 2016, by the Japanese Patent Office as the International Searching Authority for International Application No. PCT/GB2016/050106.

Great Britain Search Report dated Jul. 12, 2015, issued in corresponding Great Britain Patent Application No. GB1501601.7.

* cited by examiner

INSULATED CONDUCTORS

This invention relates to insulated conductors and particularly, although not exclusively, relates to insulated electric wire, for example magnet wire for use in challenging environments.

Electrical devices such as electric motors, alternators and generators comprise a stator and a rotor. The stator comprises a metallic core with electrically insulated wire winding through the core to form the stator coil. When alternating current passes through the core, magnetic fields are formed which cause a rotor, associated with the stator, to rotate.

The characteristics and performance of the electrically insulated wire are fundamental to performance of the aforesaid electrical devices, particularly where the devices are to be operated in challenging environments, for example in high temperature and/or high humidity environments and/or in environments wherein the electrical devices may come into contact with corrosive or otherwise harmful chemicals. For example, electrical devices may be incorporated into apparatus, for example, electrical submersible pumps, which are subject to high temperatures and noxious gases (e.g. sour gas) and other chemicals.

There have been numerous proposals for providing insulated magnet wire. Typically, current magnet wires use one or multiple layers of polymer insulation around a circular or rectangular cross-section metal, for example copper, conductor. The polymer insulation may be defined by one or more layers of film (often two different film compositions are used), with the objective being for the polymer insulation to be tough and provide a continuous insulating layer over the conductor.

Figure 1:
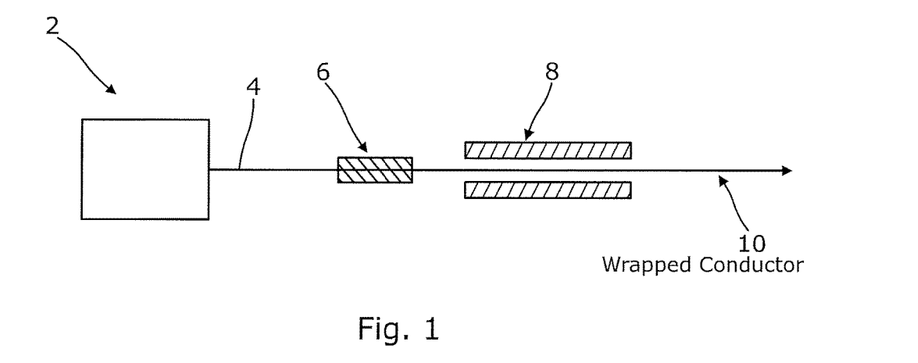
FIG. 1 is a schematic representation of a known production line for wrapping a copper conductor with a polyimide/FEP laminated tape.

A widely used, high performance polymer insulation comprises a two-layer laminated fluorinated ethylene propylene (FEP) and polyimide-based tape. The FEP layer is required since polyimide is a thermoset material and will not bond to metal. FEP is heat sealable and is arranged in direct contact with the conductor in a tape wrapping/winding process, represented in FIG. 1 which is a schematic representation of a typical production line for wrapping a copper conductor with a polyimide/FEP laminated tape. Referring to FIG. 1, a tape winding unit 2 is arranged to wrap a polyimide/FEP tape (not shown) around a copper wire to provide a wrapped conductor 4 which passes through a single induction coil/heater which rapidly heats the copper wire to about 320° C. which causes the FEP to adhere to the copper. Then, the conductor 4 passes through a radiant oven 8 which heats the conductor to 250 to 300° C. to cause cross-linking of the FEP layer and improve its bonding to the conductor. After heating in oven 8, the conductor 10 which includes a securely fixed layer of polyimide/FEP insulation may be coiled around a spool (or the like).

Disadvantageously, the polyimide/FEP coated wire may have unsatisfactory properties for some situations. For example, some chemical and/or mechanical properties of the polyimide may be insufficient to withstand particularly harsh environments. For example, the polyimide may in some situations be affected by sour gas and/or be susceptible to hydrolysis. In addition, the line speed achievable using the FIG. 1 arrangement may be limited by the need to cross-link the FEP in the oven 8. Furthermore, the necessity to provide a relatively long oven 8 means the footprint of the apparatus is relatively large. In addition, subjecting the copper to elevated temperatures for relatively long periods in the oven 8 may cause embrittlement of the copper conductor.

It has been proposed to use other polymers for insulating copper conductors. For example, there have been proposals to use polyaryletherketones, for example polyetheretherketone (PEEK). Applicant attempted to use the apparatus described in FIG. 1 to apply a PEEK tape to a copper conductor. However, it was found that there was significant blistering of the PEEK (representing pockets of air within the film) on the conductor which detrimentally affected the breakdown voltage of the insulated conductor and, furthermore, it was not possible to produce a PEEK layer having acceptable crystallinity whilst minimizing oxidation of the copper. Applicant has appreciated that, if crystallinity is not substantially constant across the PEEK layer, then the PEEK layer will be stressed which may lead to cracking of the PEEK layer if a PEEK insulated conductor is wrapped around a spool. Furthermore, it is found that, if the oxidation level of the copper conductor is too high, adhesion of the PEEK layer is unacceptably low to the manufacturer, resulting in the insulated copper conductor failing industry standard test ASTM D1676. The aforementioned problems are particularly acute when the copper conductor has a non-circular, for example rectangular cross-section.

It is an object of the present invention to address the above-described problems.

According to a first aspect of the invention, there is provided an insulated conductor comprising an elongate conductor provided with an insulating layer which comprises a polymeric material, wherein said polymeric material has a crystallinity of at least 25%, wherein said polymeric material includes a repeat unit of general formula (I)

wherein t1 and w1 independently represent 0 or 1 and v1 represents 0, 1 or 2.

Unless otherwise stated, assessment of the crystallinity of said polymeric material of said insulating layer on said elongate conductor may be carried out as described in Example 4 hereinafter.

Said crystallinity is preferably at least 28%, more preferably at least 30%.

The crystallinity of said polymeric material may be assessed as aforesaid at a first position on said insulating layer. Thus, crystallinity is suitably at least 25% (preferably at least 28%, more preferably at least 30%) at said first position. The crystallinity of said polymeric material may be assessed as aforesaid at a second position on said insulating layer. The crystallinity at said second position is suitably at least 25% (preferably at least 28%, more preferably at least 30%). Said first position may be spaced from the second position by a distance of at least 1 m. The crystallinity of said polymeric material may be assessed as aforesaid at a third position on said insulating layer. The crystallinity at said third position is suitably at least 25% (preferably at least 28%, more preferably at least 30%). Said first position may be spaced from the third position by a distance of at least 10 m. Said second position may be spaced from the third position by a distance of at least 9 m. The crystallinity of said polymeric material may be assessed as aforesaid at a fourth position on said insulating layer. The crystallinity at said fourth position is suitably at least 25% (preferably at least 28%, more preferably at least 30%). Said fourth position may be spaced from the first position by a distance of at least 20 m. In some cases, said distance may be at least 50 m, for example in the range 50 m to 200 m.

Said first position may be at a first end of the insulated conductor. Said fourth position may be at a second, opposite end, of the insulated conductor. Said second position may be halfway between said ends of the insulated conductor. Said third position may be halfway between said second and fourth positions.

Suitably said insulating layer extends along the entirety of the elongate conductor. Said insulating layer suitably extends from said first end to said second end of said insulated conductor. Said insulating layer preferably defines a continuous, uninterrupted layer between said first and second ends. For the avoidance of doubt, it will be appreciated that at first and second ends of the insulated conductor (i.e. at the respective end faces), the elongate conductor is exposed—i.e. the insulating layer does not cover the ends of the elongate conductor. Thus, preferably, except for said first and second ends (e.g. respective end faces), said insulating layer fully encloses said elongate conductor.

The crystallinity of said polymeric material is suitably at least 25% (preferably at least 28%, more preferably at least 30%) across substantially the entire extent of said insulating layer. The crystallinity of said polymeric material is preferably substantially constant across the extent of said insulating layer. Suitably, the crystallinity of said polymeric material across the extent of said insulating layer varies by less than 10%. For example, the difference between the minimum crystallinity and the maximum crystallinity of polymeric material of the insulating layer is less than 10%.

Said insulting layer is preferably devoid of areas (often referred to as amorphous patches) wherein the crystallinity is less than 15%.

Crystallinity of said polymeric material described in any statement herein may be less than 40%.

Said insulating layer is preferably homogenous, suitably across its entire extent.

Suitably, at least 90 wt %, preferably at least 95 wt %, more preferably at least 99 wt % of said insulating layer comprises thermoplastic polymeric material. Suitably, at least 90 wt %, preferably at least 95 wt %, more preferably at least 99 wt % of said insulating layer comprises said polymeric material. In some cases, said insulating layer may comprise said polymeric material and a filler, for example boron nitride. Preferably, however, said insulating layer does not include any filler. Preferably, said insulating layer consists essentially of said polymeric material, especially polyetheretherketone (PEEK). Said insulating layer preferably comprises only one type of thermoplastic polymer which is said polymeric material.

Said polymeric material may have a repeat unit selected from a repeat unit I wherein t1=1, v1=0 and w1=0; t1=0, v1=0 and w1=0; t1=0, w1=1, v1=2; or t1=0, v1=1 and w1=0. Said polymeric material more preferably has a repeat unit wherein t1=1, v1=0 and w1-0; or t1=0, v1=0 and w1=0. Said polymeric material more preferably has a repeat unit wherein t1=1, v1=0 and w1=0.

Said polymeric material suitably includes at least 50 mol %, (e.g. 50-100 mol %), preferably at least 60 mol % (e.g. 60-100 mol %), more preferably at least 80 mol % (e.g. 80 to 100 mol %), especially at least 99 wt %, of repeat units of formula I, especially such units where t1=1, v1=0 and w1=0.

Said polymeric material suitably includes at least 50 wt % (e.g. 50-100 wt %), preferably at least 80 wt %, more preferably at least 95 wt % of repeat units of formula I.

Said polymeric material preferably consists essentially of a repeat unit of a formula I, especially such a repeat unit wherein t1=1, v1=0 and w1=0.

In preferred embodiments, said polymeric material is selected from polyetheretherketone, polyetherketone, polyetherketoneetherketoneketone and polyetherketoneketone. In a more preferred embodiment, said polymeric material is selected from polyetherketone and polyetheretherketone. In an especially preferred embodiment, said polymeric material is polyetheretherketone.

Said polymeric material preferably has a melt viscosity (MV) measured as described in Example 5 at 400° C. of at least 0.06 kNsm$^{-2}$, preferably of at least 0.08 kNsm$^{-2}$, more preferably of at least 0.085 kNsm$^{-2}$, especially of at least 0.09 kNsm$^{-2}$. Said polymeric material may have a MV of less than 1.00 kNsm$^{-2}$, suitably less than 0.8 kNsm$^{-2}$.

Said insulating layer preferably directly contacts said elongate conductor. Thus, preferably, the insulated conductor does not include an intermediate layer, for example an adhesive layer (e.g. a layer of a different composition to said insulating layer), between the elongate conductor and said insulating layer. Said insulated conductor preferably passes test ASTM D1676 as described herein.

Said insulating layer preferably has a thickness of less than 300 μm, for example less than 250 μm. The thickness may be at least 2 μm or at least 20 μm. The thickness of the insulating layer is preferably substantially constant across the extent of the insulating layer. Thus, preferably, the ratio defined as the thickness of the insulating layer at its thinnest point divided by the thickness of the insulating layer at its thickest point is at least 0.8, preferably at least 0.9, more preferably at least 0.95.

Said insulating layer is preferably not covered with another material, for example another layer. Preferably said insulating layer defines an outermost layer of said insulated conductor. Said insulating layer is preferably an exposed layer (e.g. it is exposed to the ambient atmosphere) of said insulated conductor.

Said insulated conductor may comprise x wt % of said elongate conductor and y wt % of said polymeric material, wherein the sum of x and y is suitably at least 90 wt % of the total weight of said insulated conductor. Preferably, the sum of x and y is at least 95 wt %, more preferably at least 99 wt %, especially 100 wt %, of the total weight of said insulated conductor.

Said elongate conductor preferably is a copper conductor. Preferably, except for any low level impurities, the only metal included in said elongate conductor is copper.

Advantageously, the process described hereinafter, used to produce the insulated conductor, causes minimal oxidation of the outer surface of the elongate conductor, for example the copper conductor described. Said insulated conductor preferably does not include an oxidized layer (e.g. an oxidized copper layer) which is greater than 1000 nm, for example greater than 500 nm or greater than 300 nm, thick. The insulated conductor may include an oxide layer which is no greater than 1000 nm, for example no greater than 500 nm, especially no greater than 300 nm thick. An oxide layer may be assessed by XPS as hereinafter described.

Said elongate conductor may have a cross-section which has a maximum dimension of 20 mm or less. The minimum dimension of the cross-section may be at least 0.5 mm.

Said elongate conductor may have a non-circular cross-section. It is challenging to produce an insulated conductor having a non-circular cross-section and the characteristics descried herein. Nevertheless, the process described is especially advantageous for producing an insulated conductor with a non-circular cross-section. Said elongate conductor may have a cross-section which includes a first outwardly facing surface and a second outwardly facing surface, wherein said first and second surfaces are preferably substantially planar and, preferably, said first and second surfaces face in opposite directions but extend substantially parallel to one another. Said elongate conductor is preferably substantially rectangular. Said insulated conductor is preferably substantially rectangular in cross-section.

Said elongate conductor may have a thickness in the range 1.5 mm to 4 mm (preferably 1.6 to 3.5 mm) and a width in the range 3 to 20 mm.

Said insulating layer is preferably substantially devoid of blisters (e.g. defined by air trapped within a pocket in the insulating layer). The surface area of blisters in said insulating layer suitably represents less than 5%, preferably less than 1% of the total surface area of the insulating layer.

Said insulated conductor may include helical marks (often referred to as "witness marks"), suitably at positions along substantially the entire extent of the conductor. Such marks suitably illustrate that the insulating layer has not been produced in an extrusion process An extrusion process would not produce such marks.

Said insulated conductor preferably has a length of at least 10 m, for example at least 50 m, especially at least 100 m. Said insulated conductor preferably has a breakdown voltage in the range 4 to 30 kV, when measured as described in Example 3. Said insulated conductor is preferably wrapped around a spool. Said insulated conductor is preferably magnet wire.

The invention extends to a stator coil incorporating said insulated conductor described.

The invention extends to an electrical submersible pump (ESP) comprising said insulated conductor described. A motor lead extension (MLE) cable may comprise an insulated conductor described. The invention extends to a motor assembly incorporating said insulated conductor described. Said motor assembly suitably includes said stator coil incorporating said insulated conductor described.

According to a second aspect of the invention, there is provided a method of making an insulated conductor, the method comprising:
(i) selecting an elongate conductor;
(ii) wrapping the conductor with tape (e.g. MDO tape) which comprises a polymeric material, wherein said polymeric material includes a repeat unit of general formula wherein t1 and w1 independently represent 0 or 1 and v1 represents 0, 1 or 2;
(iii) heating the tape to melt the polymeric material;
(iv) cooling the heated tape to solidify the polymeric material, wherein, suitably, cooling of the tape is controlled so the polymeric material has a crystallinity of at least 25% after cooling.

The insulated conductor of the second aspect may have any features of the insulated conductor of the first aspect.

Said elongate conductor may have any features of the elongate conductor of the first aspect. However, the elongate conductor selected in step (i) may be less oxidized compared to elongate conductor in the insulated conductor of the first aspect due to some limited oxidation of the elongate conductor during the method. Said elongate conductor selected in step (i) preferably consists essentially of copper.

Preferably, said tape referred to in step (ii) is Machine Direction Orientated (MDO) tape. Said tape is preferably uniaxially oriented. Said tape may have a tensile strength of at least 200 MPa, preferably at least 300 PMa. Said tensile strength may be less than 450 MPa. Said tape may have a break stress of at least 170 MPa, preferably at least 220 MPa. Said break stress may be less than 350 MPa. Said tape may have a yield stress of at least 50 MPa, preferably at least 70 MPa. Said yield stress may be less than 120 MPa. Tensile strength, break stress and yield stress may be assessed as described in ASTM D882.

Said tape may have a thickness of less than 250 μm. It may have a thickness of at least 1 μm, Said tape preferably has a thickness in the range 2 to 100 μm, more preferably 4 to 75 μm, especially 8 to 50 μm. Said tape may have a width in the range 3 to 50 mm, for example in the range 12 to 25 mm.

Said tape may be provided on a carrier from which it is withdrawn in the method. The carrier may carry in excess of 50 m of tape.

In step (ii), tape is preferably withdrawn from a plurality of carriers and a plurality of separate lengths of tape are used to wrap the conductor. In step (ii), said tape is preferably directly contacted with said elongate conductor. In step (ii), suitably the conductor is wrapped with tape so that at least two, preferably at least three (and preferably fewer than eight) overlapping layers of tape are arranged on the elongate conductor. Preferably, at the end of step (ii), said elongate conductor carries a layer of tape which has a thickness in the range 2 to 300 μm.

Said polymeric material of said tape may be as described in accordance with the first aspect.

Said tape may include at least 90 wt %, preferably at least 95 wt %, more preferably at least 99 wt % of said polymeric material. Said tape preferably consists essentially of said polymeric material, especially polyetheretherketone (PEEK).

When said conductor is wrapped with a plurality of separate lengths of tape, preferably each length of tape used to wrap said conductor comprises said polymeric material (I)

and/or preferably all tapes used are identical and comprise, preferably consist essentially of, PEEK.

The method may comprise first and second heating steps. Preferably, a first heating step (referred to hereinafter as step (iii)*), prior to step (iii), comprises heating the tape to a temperature which is less that the melting temperature (Tm) of said polymeric material. The tape may be heated to a temperature which is no greater than 10° C. (e.g. no greater than 5° C.) less than the Tm of said polymeric material. When said polymeric material comprises PEEK, the tape may be heated to a temperature of less than 343° C., but greater than 333° C. In step (iii)*, the tape is suitably heated so that it becomes tacky and adheres to some degree to said elongate conductor.

Preferably, in step (iii)*, the tape shrinks. For example, the length of the tape may be reduced by at least 5% through such shrinkage. Step (iii)* preferably comprises induction heating of said conductor wrapped with tape, suitably using a first induction heater.

In a preferred embodiment, said elongate conductor has a non-circular cross-section which suitably includes a first outwardly facing surface and a second outwardly facing surface, wherein said first and second surfaces are substantially planar, face in opposite directions and extend substantially parallel to one another. For example, in said preferred embodiment, said elongate conductor preferably has a rectangular cross-section. In the preferred embodiment, said method may include a step (iii)** which is suitably after step (iii)* and before step (iii), wherein step (iii) comprises applying pressure to the conductor wrapped with tape to urge the tape towards the elongate conductor. Advantageously, step (iii) may reduce the number of blisters which are associated with the tape.

Pressure may be applied as aforesaid by opposing rollers which are arranged to contact first and second outwardly facing surfaces of said elongate conductor. The rollers are preferably resilient. They may comprise a polymeric material, for example silicone.

Step (iii) (which suitably comprises the second heating step referred to) preferably comprises heating the tape to a temperature which is greater than the Tm of said polymeric material, preferably so the polymeric material melts. Step (iii) may comprise heating the tape to a temperature which is at least 10° C., preferably at least 20° C., above the Tm of said polymeric material. It may be heated to a temperature which is less than 50° C. greater than said Tm. Preferably, in step (iii), the tape is melted thereby to define a substantially homogenous insulating layer made from multiple layers of said tape. Step (iii) preferably comprised induction heating of said elongate conductor wrapped with tape, suitably using a second induction heater.

When said elongate conductor has a non-circular cross-section as described, the method may include a step after step (iii) which comprises applying pressure to the conductor wrapped with tape. This may reduce the number of blisters associated with the tape.

Pressure may be applied as aforesaid by opposing rollers which are arranged to contact first and second outwardly facing surfaces of said elongate conductor. The rollers are preferably resilient. They may comprise a polymeric material, for example silicone.

Preferably, no covalent bonds are formed between the polymeric material and any other material during heating of the tape. Preferably, no covalent bonds are formed within (e.g. by cross-linking) or with the polymeric material in the method.

Preferably, after step (iii), the conductor wrapped with tape is cooled. It may be cooled actively or passively (e.g. by being subjected to ambient conditions). After step (iii), preferably the conductor wrapped with tape is cooled in a first cooling step wherein the polymeric material solidifies. The first cooling step preferably comprises subjecting the conductor wrapped with tape to ambient conditions. In the first cooling step, the polymeric material in the conductor wrapped with tape is preferably cooled to at least 3° C. less than the Tm of said polymeric material. Preferably, at the end of the first cooling step, the polymeric material is at a temperature which is greater than its crystallisation temperature (Tc), for example at least 10° C. or at least 30° C. greater than its Tc.

Preferably, after the first cooling step, the conductor wrapped with tape is cooled, for example quench cooled, in a second cooling step. The second cooling step preferably comprises active cooling of said conductor wrapped with tape.

Said second cooling step may comprise directing a cooling fluid, for example liquid (especially which comprises or consists essentially of water), at the conductor wrapped with tape. The cooling fluid may be at a temperature of at least 10° C. and preferably less than 90° C. (e.g. in the range 15 to 35° C.) immediately prior to contact with the conductor wrapped with tape. The cooling fluid may be sprayed at the conductor wrapped with tape, suitably so the fluid contacts substantially the entirety of the external surface of the conductor wrapped with tape. The cooling fluid is suitably arranged to limit oxidation of the elongate conductor (e.g. copper). Such cooling may also reduce crystallinity of the polymeric material (e.g. render it amorphous). Subsequent steps are preferably arranged to increase the level of crystallinity.

After said second cooling step, there is preferably a cooling fluid removal step. In this step, cooing fluid is suitably removed from contact with the conductor wrapped with tape. The cooling fluid removal step may comprise subjecting the conductor wrapped with tape to a gas, suitably to blow the cooling fluid away from the conductor wrapped with tape, preferably so that substantially all of said cooling fluid is removed from contact with said conductor wrapped with tape. The cooling fluid removal step may involve use of air knives.

The method is preferably controlled so that, after cooling (e.g. active cooling using said cooling fluid) of the conductor wrapped with tape (e.g. after said cooling fluid removal step), residual heat in the elongate conductor and/or associated with the conductor wrapped with tape is such that the polymeric material thereof can anneal and/or crystallise. Thus, after said cooling, the polymeric material is at a temperature of greater than the glass transition temperature (Tg) of said polymeric material and/or annealing of said polymeric material takes place.

After said annealing, said polymeric material suitably has a crystallinity of at least 25%, preferably at least 28%, more preferably at least 30%.

The method preferably comprises winding the insulated conductor made around a spool. The conductor is suitably as described according to the first aspect.

The conductor wrapped with tape after step (ii) of the method is believed to be novel. Thus, according to a third aspect of the invention, there is provided an intermediate product comprising an elongate conductor wrapped with MDO tape, wherein said MDO tape comprises a polymeric material, wherein said polymeric material includes a repeat unit of general formula wherein t1 and w1 independently represent 0 or 1 and v1 represents 0, 1 or 2.

Said elongate conductor may be as described in any statement herein. Said MDO tape may be as described in any statement herein. Said polymeric material may be as described in any statement herein.

Said intermediate product may comprise the elongate conductor wrapped with MDO tape after the first heating step described in the second aspect. Thus, the MDO tape may be adhered to the elongate conductor. Said MDO tape may be shrunk.

According to a fourth aspect of the invention, there is provided apparatus for producing an elongate conductor according to the first aspect, making an insulated conductor according to the second aspect and/or for making an intermediate product according to the third aspect, the apparatus comprising:
(i) a transportation device for transporting an elongate conductor between a first position and a second position;
(ii) a winding unit for winding a tape comprising a polymeric material around the elongate conductor;
(iii) a first induction coil for heating the elongate conductor to a first temperature during passage between said first and second positions;
(iv) a second induction coil for heating the elongate conductor to a second temperature higher than said first temperature, said second induction coil being downstream of said first induction coil; and, optionally,
(v) a cooling apparatus downstream of said second induction coil.

Said first induction coil may be arranged to implement the first heating step (i.e., step (iii)*) of the method of the second aspect. Said second induction coil may be arranged to implement the second heating step of the method of the second aspect.

Said cooling apparatus is preferably arranged to implement the second cooling step of the method of the second aspect. Said cooling apparatus may include a series of spray devices arranged to spray a cooling fluid at a conductor wrapped with tape produced in the apparatus. Said cooling apparatus may be arranged to implement the cooling fluid removal step of the second aspect. Said cooling apparatus may include a series of air knives.

Said apparatus may be provided in combination with MDO tape comprising said polymeric material as described herein.

Any feature of any aspect of any invention described herein may be combined with any other invention described herein mutatis mutandis. Specific embodiments of the invention will now be described, by way of example, with reference to the accompanying figures in which:

The following material is referred to hereinafter: Machine-Direction Orientated (MDO) polyetheretherketone (PEEK) polymer tape—refers to PEEK tape which has been uniaxially oriented following generally the procedure described in Example 3 of Research Disclosure database number 216001, disclosed by B. P. Griffin and I. D. Luscombe of Imperial Chemical Industries Plc. Typically the MDO tape has the following properties measured in accordance with ASTM D882: Tensile strength—338 MPa; Break stress—256 MPa; and Yield stress—84 MPa.

Figure 2:
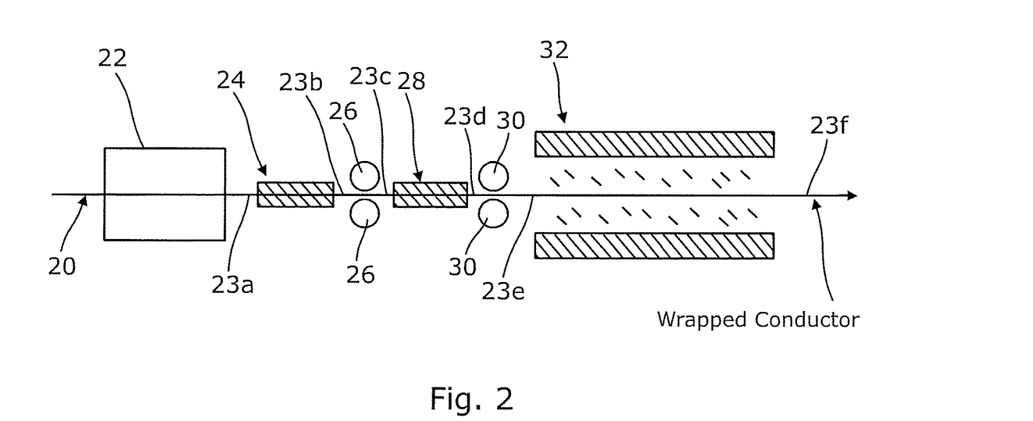
FIG. 2 is a schematic representation of a production line for wrapping a copper conductor with a polyetheretherketone (PEEK) tape.

Referring to FIG. 2, a rectangular cross-section copper conductor 20 is wrapped with Machine-Direction Orientated (MDO) polyetheretherketone (PEEK) polymer tape (not shown) withdrawn from a winding unit 22. The assembly 23a of conductor wrapped with tape passes through a first induction coil 24 which produces enough energy to raise the temperature of the PEEK polymer to 340° C. (i.e. just below the melting temperature (Tm) of PEEK). Temperature may be monitored using a suitably positioned pyrometer focussed on the PEEK layer. As a result of the heating, the MDO tape shrinks around the copper conductor (i.e. the tape shrinks back towards its state existing before being subjected to a stretching process to produce MDO tape) and, additionally, the tape becomes tacky so it sticks to conductor 20.

After exiting the first induction coil 24, assembly 23b comprising conductor and shrunk tape, passes between a first pair of silicone rollers 26 which are arranged to contact the assembly 23b and apply pressure to opposing sides of it to remove trapped air, flatten blisters and/or improve surface finish. Downstream of rollers 26, assembly 23c passes through a second induction coil 28 which causes rapid heating of the copper conductor to approximately 380° C. which is above the melting temperature (Tm) of the PEEK layer. Consequently, the PEEK layer melts which causes it to stick to the underlying copper conductor and produce a continuous smooth PEEK layer around the conductor.

After exiting the second induction coil 28, assembly 23d passes between a second pair of silicone rollers 30 which, as for rollers 26, contact the assembly 23d and apply pressure to opposing sides of it to remove trapped air, flatten blisters and/or improve surface finish.

Downstream of rollers 30, assembly 23e passes through cooling apparatus 32 which is arranged to rapidly cool the copper conductor of assembly 23e, to limit oxidation of the copper, whilst allowing the PEEK layer to cool slowly to optimise the level of crystallinity in the PEEK layer.

After exiting the cooling apparatus 32, assembly 23f comprising relatively non-oxidized copper insulated with a highly crystalline thin PEEK layer can be wrapped around a spool prior to use in an electrical device.

Features of preferred embodiments of the invention are described in more detail below.

The copper conductor may comprise ETP bare copper wire and be in the form of an elongate, rectangular cross-section wire. The cross-section may have a width of 3-20 mm and a thickness of 1.6-3.5 mm. A preferred cross-section is about 8×2 mm.

As an alternative to use of rectangular cross-section wire, conductors of other shapes may be treated as described herein. For example, circular (e.g. having diameter in the range 0.5 to 10 mm) or elliptical cross-section wires, stranded wires or segmented wires may be used. However, preferably, the wire has a rectangular cross-section.

As an alternative to use of copper, aluminium conductors may be treated as described. In particular, the process described herein may be applied to any metal susceptible to oxidation as described herein for copper.

As described, the PEEK polymer tape is MDO tape. It may be manufactured as described generally in Research Disclosure database number 21600 and have a width in the range 3-50 mm and a thickness in the range 1 to 250 µm. Examples described herein were produced using tape of width 12 mm and thickness of 18 µm.

Figure 3:
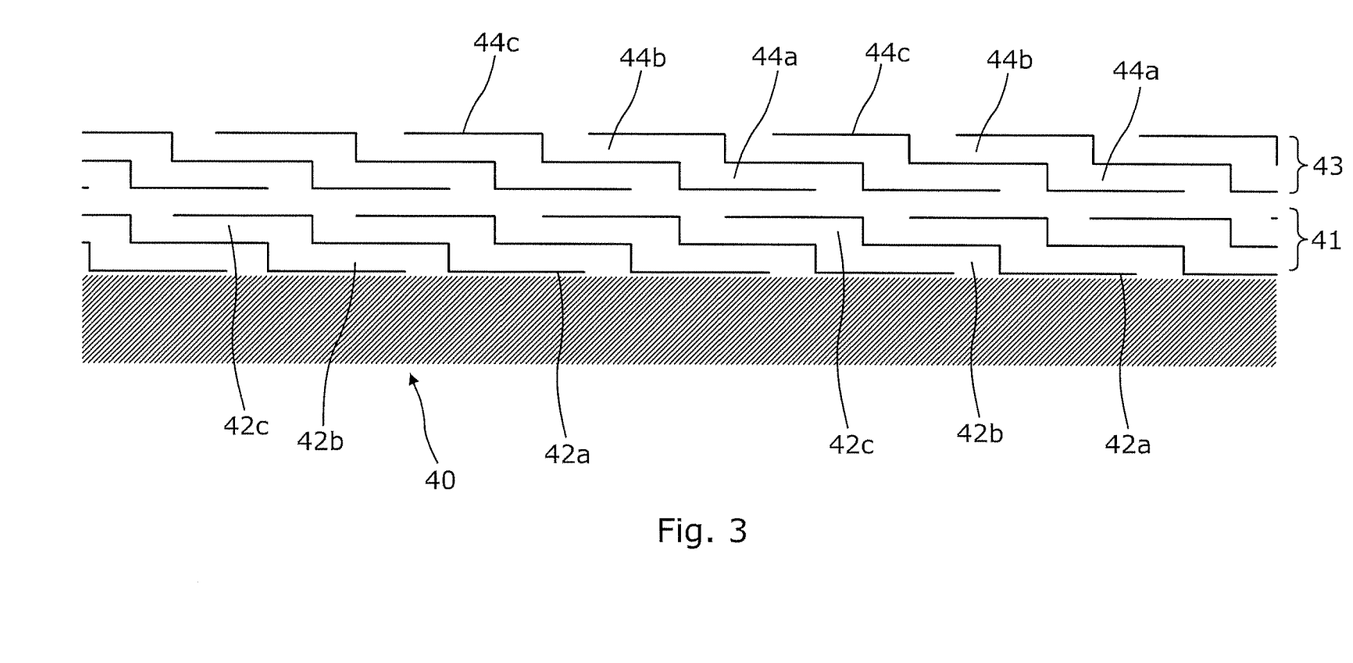
FIG. 3 is schematic representation of a cross-section through a wrapped conductor showing layers of tape on the conductor prior to consolidation.

The winding unit is suitably a proprietary unit. It may be operable at or above about 1500 rpm to wind at or above 8 m/min of tape on the copper conductor. The tape may be wound using industry standard overlap arrangements. For example, in one embodiment, represented in FIG. 3, a copper conductor 40 may be double wrapped wherein one wrap 41 comprises three layers 42a, 42b and 42c and the other wrap 43 comprises layers 44a, 44b and 44c. Thus, in the embodiment, the copper conductor is covered with PEEK tape which is six layers thick.

The first induction coil 24 is arranged to heat the copper conductor (but not the PEEK because it is not conductive), so that, on exiting the coil 24, the surface of the wrapped conductor has a temperature of about 340° C.

As described above, one objective of use of the first induction coil is to raise the temperature of the PEEK tape to just below its melting temperature. Consequently, the tape shrinks back towards its original state prior to being subjected to stretching to produce the MDO tape. In the process, shrinkage is compensated for by initial selection of an appropriate overlap arrangement of the tape. It is also important to minimise the time the copper conductor is subjected to elevated temperatures in the first induction coil, so as to minimise oxidation of the outer surface of the copper.

The silicone rollers 26, 30 described need to be such that they retain suitable properties at the relatively high temperatures to which they are subjected in the process. The first pair of silicone rollers 26 have a width which is greater than the width of the assembly 23b which passes between them, so the rollers completely overlap the top and bottom surfaces of the assembly 23c as it passes between them. The rollers 26 are freely rotatable by the assembly 23b as it passes through, but are not themselves driven.

The second induction coil 28 is also arranged to heat the copper conductor but to a higher temperature compared to the first induction coil.

In the process, the assembly 23c may be within the confines of and/or heated by the second induction coil for the minimum time appropriate. As described above, the objective of use of the second induction coil is to rapidly heat the copper conductor to 380° C. to cause the PEEK layer to melt and adhere to the copper. If the PEEK layer is subjected to too high a temperature and/or to high temperature for too long, the PEEK layer may disadvantageously blister. The second pair of silicone rollers 30 are generally as described for the first pair of rollers 26.

Figure 4:
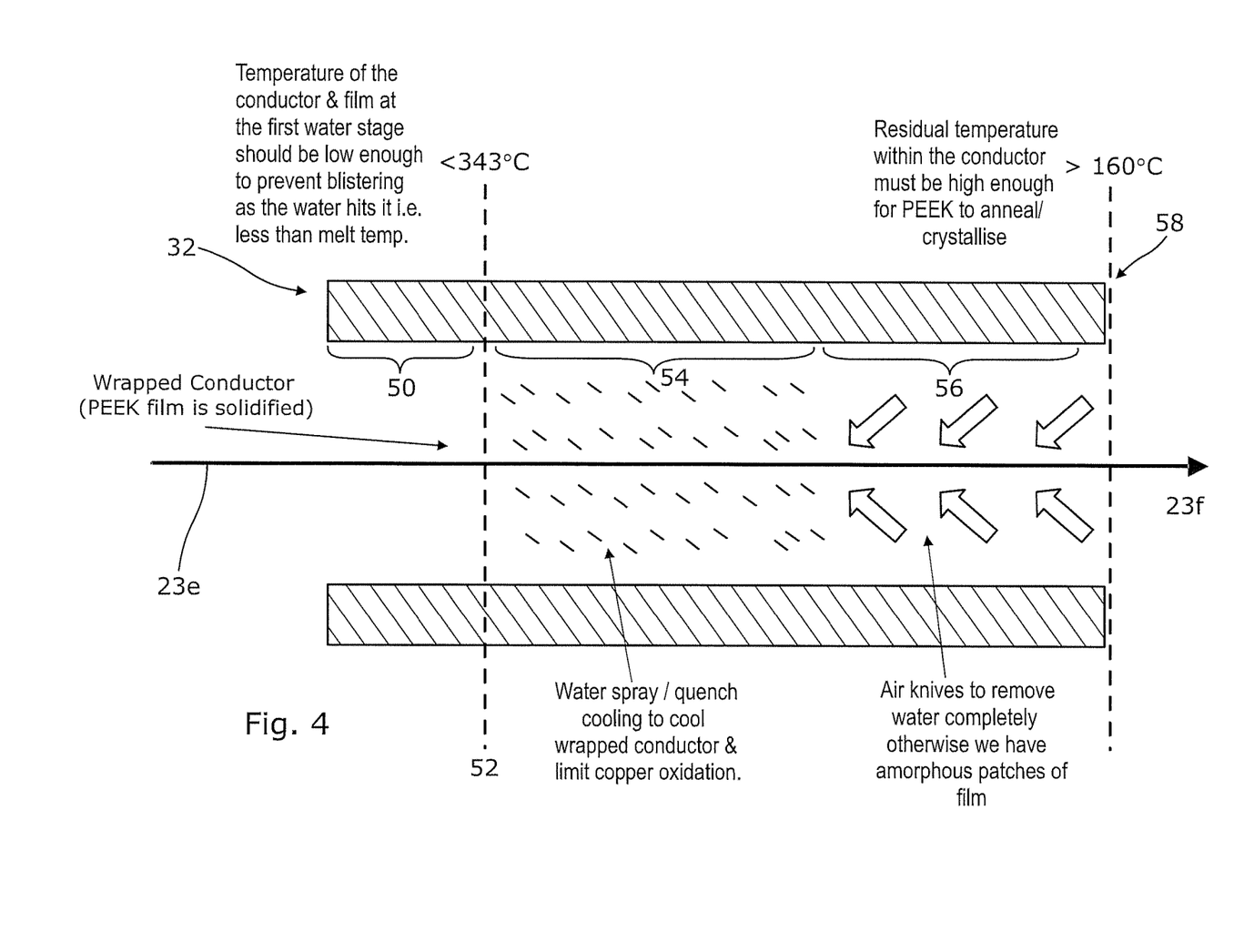
FIG. 4 is a schematic representation of a cooling apparatus for cooling a hot assembly comprising a copper conductor wrapped with a PEEK tape.

The cooling apparatus 32 is shown in more detail in FIG. 4. In a first region, represented by numeral 50, the assembly 23e is subjected to ambient temperature so that, by the time the assembly reaches position 52, the PEEK layer has a temperature which is less than its melting temperature (i.e. less than about 343° C.); that is, the PEEK layer has solidified. This prevents blistering when the assembly 23e is subjected to water cooling downstream. The temperature is, however, higher than the crystallisation temperature (Tc) of the PEEK—i.e. higher than 278° C. Downstream of position 52 in a region represented by numeral 54, a series of water sprayers are positioned around and along the assembly 23e. The sprayers are arranged to spray water at a temperature maintained at a constant 20° C. at the assembly 23e to rapidly cool it and limit oxidation of the copper conductor by effectively removing heat from it.

Downstream of region 54 is a region 56 which comprises a series of air knives positioned around and along the assembly 23e. The air knives are arranged to completely remove water from the surface of the assembly, since it has been found that the presence of residual water can lead to the disadvantageous production of amorphous patches of PEEK on the final product 23f.

After removal of water in region 56, conductor 23f exits the cooling apparatus 32. However, the cooling apparatus 32 is arranged so that, at the exit position 58, the residual heat within the copper conductor is high enough for the PEEK layer to anneal after exiting the cooling apparatus 32. Suitably, therefore, at position 58, conductor 23f includes sufficient heat for the PEEK layer to reach a temperature of greater than 160° C. without subjecting the conductor 23f to any additional heating, downstream of cooling apparatus 32.

Downstream of cooling apparatus 32, the conductor 23f is suitably allowed to cool in ambient air and immediately spooled. For example, conductor 23f may be continuously spooled onto a spool positioned within a distance of 2-10 m from position 58.

The haul off speed and/or speed of winding on the spool may be relatively high—for example in excess of 8 m/minute.

Advantageously, the apparatus described with reference to FIGS. 2 and 4 can be used to produce very high quality PEEK-insulated copper wire at a rapid rate.

Characteristics of the wire produced may be confirmed as follows:

EXAMPLE 1

Evaluation of Adhesion of the Wrapped Insulating Coating

Elongation provides a general measure of the ductility of film-insulated magnet wire and useful indications of the flexibility and adherence of film insulation to the conductor may be derived from the following test.

Magnet wire manufactured by the process described above and having a PEEK insulation layer of 36 µm thickness and 30.4% crystallinity was tested for elongation according to section 122-129 of ASTM D1676 (Standard Test Methods for Film-Insulated Magnet wire) except that a 100 mm length of wire was used. The wire was stretched at a constant rate (300 mm/min) until break using an Instron 3369 Tensometer at 23° C. with 50% room humidity. Samples were then visually inspected at the break point and along the sample length.

The samples showed that the wrapped PEEK insulating film had excellent adhesion to the conductor as illustrated by limited delamination of the insulation immediately at the point where the wire began to neck down before the break point

EXAMPLE 2

Evaluation of Copper Layer

The thickness of the oxide layer on the copper referred to herein may be assessed using X-ray photoelectron spectroscopy (XPS). The thickness of the oxide layer is generally found to be within the range 5-300 nm.

EXAMPLE 3

Evaluation of Breakdown Voltage

Testing was performed at ambient temperature (23° C.) and relative humidity using a Sefelec RMG15AC HiPot Dielectric Strength tester with reference to EN60851-5 standard.

In a specific example, a 3.264 mm diameter copper conductor insulated with an 18 μm PEEK film at 66% overlap to define a total PEEK thickness of 108 μm and having a crystallinity in the final wire of 32%, was assessed.

A total of 8×200 mm long test specimens were firstly prepared by completely removing 25 mm of the PEEK insulation from one end of the insulated conductor specimens using a sharp knife to expose the bare copper conductor. Electrodes were prepared by applying a thin metal foil backed by a conductive, pressure sensitive tape to the centre of each test specimen. These electrodes were typically 6 mm wide and approximately 60 mm in length. Each electrode was applied at a right angle to the specimen. Electrodes were wrapped smoothly and firmly around the specimens a minimum of one complete turn.

A sinusoidal ac voltage was applied between an electrode and the bare copper end. This voltage was applied at a rate of 0.5 kV per second and the minimum voltage at which the film insulation was punctured, was subsequently recorded. This breakdown voltage was found to be in the range 10.7-12.7 kV.

EXAMPLE 4

Evaluation of Crystallinity of Peek Layer on a Wrapped Conductor

To obtain a sample of the PEEK layer from the insulated conductor, after application, for measurement by DSC, an area of tape 0.5 cm$^{-2}$×0.5 cm$^{-2}$ and approximately 100 μm thick was cut out of the insulating tape layer using a sharp knife and by lifting the layer away from the copper conductor with the knife whilst flexing the conductor.

Two pieces of cut out tape (approximately 10 mg) were placed together in a DSC pan and scanned by DSC as follows:
 Step 1 Perform and record a preliminary thermal cycle by heating the sample from 30° C. to 400° C. at 20° C./min.
 Step 2 Hold for 5 minutes.
 Step 3 Cool at 20° C./min to 30° C. and hold for 5 mins.
 Step 4 Re-heat from 30° C. to 400° C. at 20° C./min, recording the Tg, Tn, Tm, ΔHn and ΔHm.

Tc is measured on the cooling cycle (Step 3) and is the temperature at which the crystallisation exotherm reaches a minimum.

From the DSC trace resulting from the scan in step 4, the onset of the Tg was obtained as the intersection of the lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reached a maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (X (%)) is determined by dividing the Heat of Fusion of the specimen by the Heat of Fusion of a totally crystalline polymer, which for polyetheretherketone is 130 J/g.

EXAMPLE 5

Determination of Melt Viscosity (Mv) of Polymer

Unless otherwise stated, this was measured using capillary rheometry operating at 400° C. at a shear rate of 1000s$^{-1}$ using a circular cross-section tungsten carbide die, 0.5 mm (capillary diameter×3.175 mm (capillary length). The MV measurement was taken 5 minutes after the polymer had fully melted, which is taken to be 5 minutes after the polymer is loaded into the barrel of the rheometer.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An insulated conductor comprising an elongate conductor provided with an insulating layer which comprises a polymeric material, wherein said polymeric material has a crystallinity of at least 25% across substantially the entire extent of said insulating layer, wherein the crystallinity of said polymeric material across the extent of said insulating layer varies by less than 10%, wherein said polymeric material includes a repeat unit of general formula wherein t1 and w1 independently represent 0 or 1 and v1 represents 0, 1 or 2;
 wherein said insulating layer has a thickness in the range 2 μm-300 μm.

2. A conductor according to claim 1, wherein said crystallinity is at least 30%.

3. A conductor according to claim 1, wherein the crystallinity of said polymeric material is assessed at a first position on said insulating layer, wherein said crystallinity is at least 30% at said first position; wherein the crystallinity of said polymeric material is assessed at a second position on said insulating layer, wherein said crystallinity at said second position is at least 30%;
  wherein the crystallinity of said polymeric material is assessed at a third position on said insulating layer, wherein said crystallinity at said third position is at least 30%;
  wherein said first position is spaced from the third position by a distance of at least 10 m and said second position is spaced from the third position by a distance of at least 9 m.

4. A conductor according to claim 1, wherein said insulating layer extends along substantially the entirety of the elongate conductor.

5. A conductor according to claim 1, wherein said insulting layer is devoid of areas wherein the crystallinity is less than 15%.

6. A conductor according to claim 1, wherein at least 90 wt % of said insulating layer comprises thermoplastic polymeric material.

7. A conductor according to claim 1, wherein said polymeric material is polyetheretherketone.

8. A conductor according to claim 1, wherein said insulating layer directly contacts said elongate conductor.

9. A conductor according to claim 1, wherein said elongate conductor is a copper conductor.

10. A conductor according to claim 1, wherein said insulated conductor has a breakdown voltage in the range 4 to 30 kV.

11. A stator coil incorporating an insulated conductor according to claim 1.

12. A motor assembly incorporating an insulated conductor according to claim 1.

13. A method of making the insulated conductor according to claim 1, the method comprising:
  (i) selecting an elongate conductor;
  (ii) wrapping the conductor with tape which comprises a polymeric material, wherein said polymeric material includes a repeat unit of general formula wherein t1 and w1 independently represent 0 or 1 and v1 represents 0, 1 or 2;
  (iii) heating the tape to melt the polymeric material;
  (iv) cooling the heated tape to solidify the polymeric material, wherein cooling of the tape is controlled so the polymeric material has a crystallinity of at least 25% after cooling.

14. A method according to claim 13, the method comprising first and second heating steps, wherein said first heating step (referred to hereinafter as step (iii)*), prior to step (iii), comprises heating the tape to a temperature which is less than the melting temperature (Tm) of said polymeric material.

15. A method according to claim 13, wherein said method includes a step (iii)** which is after step (iii)* and before step (iii), wherein step (iii)** comprises applying pressure to the conductor wrapped with tape to urge the tape towards the elongate conductor.

16. A method according to claim 13, wherein step (iii) comprises heating the tape to a temperature which is greater than the Tm of said polymeric material.

17. An intermediate product comprising an elongate conductor wrapped with MDO tape, wherein said MDO tape comprises a polymeric material, wherein said polymeric material includes a repeat unit of general formula wherein t1 and w1 independently represent 0 or 1 and v1 represents 0, 1 or 2,
  wherein said polymeric material has a crystallinity of at least 25% across substantially the entire extent of said insulating layer, wherein the crystallinity of said polymeric material across the extent of said insulating layer varies by less than 10%.

18. The intermediate product according to claim 17, wherein the MDO tape directly contacts the elongate conductor, and wherein the MDO tape includes at least 90 wt % of polyetheretherketone.

19. Apparatus for producing an elongate conductor, the apparatus comprising:
  (i) a transportation device for transporting an elongate conductor between a first position and a second position;
  (ii) a winding unit for winding a tape comprising a polymeric material around the elongate conductor, the polymeric material having a crystallinity of at least 25%, and including a repeat unit of general formula wherein t1 and w1 independently represent 0 or 1 and v1 represents 0, 1 or 2;
- wherein said insulating layer has a thickness in the range 2 μm-300 μm;
- (iii) a first induction coil for heating the elongate conductor to a first temperature during passage between said first and second positions;
- (iv) a second induction coil for heating the elongate conductor to a second temperature higher than said first temperature, said second induction coil being downstream of said first induction coil; and, optionally,
- (v) a cooling apparatus downstream of said second induction coil,
wherein said polymeric material has a crystallinity of at least 25% across substantially the entire extent of said insulating layer, wherein the crystallinity of said polymeric material across the extent of said insulating layer varies by less than 10% after cooling.

\* \* \* \* \*